United States Patent
Mumford et al.

(10) Patent No.: US 8,413,638 B2
(45) Date of Patent: Apr. 9, 2013

(54) DIRECTLY ACTUATED VALVE WITH A STRAIN-TYPE ACTUATOR AND A METHOD OF OPERATING SAME

(75) Inventors: David Mumford, Vancouver (CA); Alan Welch, Vancouver (CA); Alain Touchette, Vancouver (CA); Mike Hebbes, Dexter, MI (US); Richard Wing, Bowen Island (CA)

(73) Assignee: Westport Power Inc., Vancouver, BC (CA)

( * ) Notice: Subject to any disclaimer, the term of this patent is extended or adjusted under 35 U.S.C. 154(b) by 152 days.

(21) Appl. No.: 12/727,785

(22) Filed: Mar. 19, 2010

(65) Prior Publication Data

US 2010/0219360 A1 Sep. 2, 2010

Related U.S. Application Data

(63) Continuation of application No. PCT/CA2008/001659, filed on Sep. 19, 2008.

(30) Foreign Application Priority Data

Sep. 20, 2007 (CA) ..................................... 2600323

(51) Int. Cl.
*F02M 51/00* (2006.01)
(52) U.S. Cl. .................... 123/490; 251/129.01
(58) Field of Classification Search .......... 123/472, 123/478, 490, 494, 498; 251/129.01, 213, 251/284; 239/5, 585.1, 102.2
See application file for complete search history.

(56) References Cited

U.S. PATENT DOCUMENTS

| | | | |
|---|---|---|---|
| 4,725,002 A | 2/1988 | Trachte | |
| 5,605,134 A | 2/1997 | Martin | |
| 5,752,659 A | 5/1998 | Moncelle | |
| 6,298,829 B1 | 10/2001 | Welch et al. | |
| 6,427,968 B1 | 8/2002 | Stoecklein | |
| 6,564,777 B2 | 5/2003 | Rahardja et al. | |
| 6,575,138 B2 | 6/2003 | Welch et al. | |
| 6,584,958 B2 | 7/2003 | Rahardja et al. | |
| 6,685,105 B1 | 2/2004 | Ruehle et al. | |
| 6,702,250 B2 | 3/2004 | Czimmek | |
| 6,739,575 B2 | 5/2004 | Cotton, III et al. | |
| 6,978,770 B2 | 12/2005 | Rauznitz et al. | |
| 7,083,113 B2 | 8/2006 | Kropp et al. | |
| 7,195,182 B2 | 3/2007 | Fischer et al. | |
| 7,255,290 B2 * | 8/2007 | Bright et al. | 239/102.2 |
| 2005/0103587 A1 | 5/2005 | Fischer et al. | |
| 2005/0252494 A1 | 11/2005 | Rauznitz et al. | |

FOREIGN PATENT DOCUMENTS

WO 2005124141 12/2005

* cited by examiner

*Primary Examiner* — Hai Huynh
(74) *Attorney, Agent, or Firm* — Corridor Law Group, PC

(57) ABSTRACT

A method is provided for operating a directly actuated valve that comprises a strain-type actuator to actuate a valve member to travel between a closed position and an open position, the method comprising transmitting displacements from the strain-type actuator to the valve member, maintaining a compressive stress on the actuator that is greater than a predetermined minimum stress by applying a pre-load compressive stress and limiting to less than predetermined limits at least one of: (a) acceleration and deceleration of the valve member when moving between open positions and the closed position; and (b) velocity of said valve member immediately before contacting the valve seat.

45 Claims, 5 Drawing Sheets

DIRECTLY ACTUATED VALVE WITH A STRAIN-TYPE ACTUATOR AND A METHOD OF OPERATING SAME

CROSS-REFERENCE TO RELATED APPLICATION(S)

This application is a continuation of International Application No. PCT/CA2008/001659, having an international filing date of Sep. 19, 2008, entitled "Directly Actuated Valve With A Strain-Type Actuator And A Method Of Operating Same". The '659 international application claimed priority benefits, in turn, from Canadian Patent Application No. 2,600,323 filed Sep. 20, 2007. The '659 international application is hereby incorporated by reference herein in its entirety.

FIELD OF THE INVENTION

The present invention relates to a directly actuated valve with a strain-type actuator and a method of operating it. There are many applications that can benefit from a fast-acting directly actuated valve, and to illustrate the advantages of the disclosed invention it is described herein, for example, in relation to one application that is particularly suited, namely, injecting fuel directly into the combustion chamber of an internal combustion engine.

BACKGROUND OF THE INVENTION

Internal combustion engines have been used to produce power and drive machines for over a century. From the beginning, internal combustion engines have undergone many improvements to become more efficient, more powerful, and/or less polluting. Under some conditions, fuel combustion within a combustion chamber can be incomplete, and this can reduce efficiency and produce unwanted emissions of unburned fuel.

Engines can be made more efficient, more powerful, and less polluting with more precise control over the timing for fuel injection, the quantity of fuel injected, and the rate of fuel injection during an injection event. Current state of the art fuel injection valves are hydraulically actuated. For example, a hydraulically actuated valve is actuated by controlling the fluid pressure in a control chamber associated with a valve needle. Typically, hydraulic fluid pressure is kept high to hold the valve needle in a closed position and when hydraulic fluid pressure in the control chamber is reduced, fuel pressure in the nozzle of the fuel injection valve exerts an opening force on a stepped shoulder of the valve needle to lift the valve needle to an open position. In well known fashion, one or more hydraulic fluid control valves can be used in combination with fluid restricting orifices to regulate the pressure in the control chamber by opening or closing hydraulic fluid passages that connect the control chamber to a high pressure supply line or to a low pressure drain line.

State-of-the-art hydraulically actuated fuel injection valves are sometimes referred to as "electro-hydraulic" fuel injection valves because they can employ an electronically controlled hydraulic fluid control valve. For example, solenoid valves that use an electromagnetic actuator can move an armature associated with a valve member from one extreme position to another extreme position, to control the flow of a hydraulic fluid. However, such valves do not permit the valve member to be held in an intermediate position, and, while solenoid valves can be fast acting, they do not allow much control over the speed or acceleration of the valve member when moving from one extreme position to the other extreme position. That is, while solenoid valves are suitable for actuating a control valve between open and closed positions, such valves can not be used to easily control the speed, position and acceleration or deceleration of the valve needle to control the fluid mass flow rate. Some valves are designed with a geometry that allows limited control over the fuel injection rate during a fuel injection event. More recently, control valves actuated by piezoelectric or magnetostrictive actuators (herein referred to collectively as "strain-type" actuators) offer greater control over the hydraulic fluid flow. A strain-type actuator employs an element that changes shape, for example, when a voltage is applied to a piezoelectric element or when a magnetostrictive element is exposed to a magnetic field. Strain-type actuators offer potential improvements over electromagnetic actuators because strain-type actuators can deliver fast and precise movements, while also allowing actuation to positions between the extreme positions and more control over the speed and acceleration of the valve needle. In this way, control valves with strain-type actuators can behave like variable orifices to regulate hydraulic fluid pressure within the control chamber. To modulate injection rate during an injection event, electro-hydraulic valves can employ one or more strain-type actuators to control the flow of the hydraulic actuation fluid and indirectly cause movements of the valve needle by regulating the pressure of the hydraulic fluid in the control chamber. However, even with strain-type actuators operating the control valve(s), electro-hydraulic fuel injection valves still have limitations. Because the valve needle is not directly actuated by displacements caused by the strain type actuator, the speed of actuation is still limited by the speed at which fluid pressure within the control chamber can be adjusted, and variability can be introduced by factors like variations in the differential pressure between the fuel in the nozzle chamber and the hydraulic fluid in the control chamber. Because engines can operate at speeds in the thousands of rpms, the speed of actuation and the precision for injecting the desired quantity of fuel at the desired time can have a significant effect on engine performance.

When the fuel that is injected is a liquid fuel, the fuel can conveniently be used as the hydraulic fluid. However, when the fuel that is injected is a gaseous fuel, an additional disadvantage of electro-hydraulically actuated fuel injection valves is that the hydraulic actuator adds complexity and cost to the fuel injection valve because a hydraulic fluid system separate from the fuel supply system is needed.

"Directly" actuated fuel injection valves are distinguished herein from electro-hydraulically actuated fuel injection valves, in that they employ an actuator that can be activated to produce a displacement that is transmitted directly to a corresponding displacement of the fuel injection valve needle. The displacement produced by the actuator can be reproduced in the valve needle or amplified by transmission elements disposed between the actuator and the valve needle, but with a directly actuated valve, as defined herein, the valve needle displacement is directly proportional to the actuator displacement. With a directly actuated fuel injection valve there is no control chamber as there is with electro-hydraulic fuel injection valves and valve needle movement is governed by the displacement produced by the actuator and not by changing the pressure of a hydraulic fluid. Fuel injection valves can be directly actuated electromagnetically by a solenoid actuator, whereby displacements to an armature produce displacements of a valve needle, but like solenoid actuated control valves employed for electro-hydraulic valves, this type of actuator does not allow much control over the movement of the valve needle. More precise control of the valve needle can be achieved if the fuel injection valve needle is directly actuated by a strain-type actuator. The subject invention is directed specifically to directly actuated fuel injection valves that use a strain-type actuator. Because strain-type actuators can generate high needle actuation forces, the valve can be designed so that variations in the fuel pressure in the nozzle chamber do not have a significant effect on the operation of the fuel injection valve. Furthermore, faster response times are possible because actuation is direct, and does not rely on the flow of hydraulic fluid in and out of a control chamber. Examples of directly actuated fuel injection valves are disclosed in co-owned U.S. Pat. Nos. 6,298,829, 6,564,777, 6,575,138 and 6,584,958.

It is generally believed that rapid closing of the fuel injection valve at the end of an injection event is important for reducing the engine emission levels of unburned fuel, since it is more difficult to combust fuel introduced late in the combustion cycle. In addition, fuel burned later in a piston's power stroke does not generate as much power as the same amount of fuel burned earlier in the power stroke. For example, co-owned U.S. Pat. No. 6,298,829 (the '829 patent) teaches a method of accelerating the closing of a directly actuated fuel injection valve that comprises initially reversing the current to an electrical coil (or the voltage applied to a piezoelectric actuator) to reverse the magnetic field (or the voltage) applied to the coil around a magnetostrictive actuator (or a piezoelectric actuator). To slow down the valve needle and to reduce wear to the valve needle when it impacts the valve seat, the current (or voltage) can be reversed again before being brought to zero. Besides wear, another reason to reduce valve needle speed is that if the closing speed is too high, this can cause the valve needle to bounce off the valve seat, resulting in an uncontrolled amount of late-injected fuel while the valve needle is lifted from the seat on the bounce. A limitation associated with this approach is that the electronic circuits of some actuator drivers are not fast enough to smoothly and rapidly vary the current (for magnetostrictive actuators) or voltage (for piezoelectric actuators) quickly enough to apply this strategy effectively.

The '829 patent also discloses an alternative method whereby the current or voltage is more gradually reduced to zero without reversing the current or voltage. The '829 patent illustrates this method in plots of current and voltage against time by a dotted line with a much shallower slope. While this approach does reduce the impact and wear on the valve needle tip, a disadvantage is that the valve needle is not closed as rapidly, which can result in more fuel being injected later in the combustion cycle.

Desirable attributes of strain-type actuators is their ability to produce very fast movements with high force. While these attributes can help to actuate the valve member rapidly, if the valve member is moving too quickly when approaching the valve seat, in addition to the possibility of bouncing off the valve seat, with a directly actuated fuel injection valve the physical stress from the valve needle impacting the valve seat is transmitted back to the actuator through the transmission elements. Such physical stresses generated from closing the valve can be very sudden if not managed appropriately, and can result in damage to the actuator, manifested by the formation of cracks in the strain-type actuator elements and/or damage or excessive wear to the valve member or the valve seat. Such damage can be caused either by cumulative moderately severe stresses over time or by more severe stresses caused by an isolated abnormally high closing impact. Accordingly, while it is desirable to close the injection valve rapidly, with directly actuated fuel injection valves operated by strain-type actuators there is also a need to reduce the impact force of the valve needle on the valve seat because of the potential for damaging the actuator. The fastest closing time is not optimal if it results in excessive stress on the actuator and other components. Therefore, beyond simply reducing the time for closing a valve, the manner of controlling the acceleration, deceleration, and velocity of the valve needle and the transmission elements between the actuator and the valve needle during the opening and closing movements is important to prevent excessive stress on all of these components.

There is yet another consideration for fuel injection valves that are employed to inject gaseous fuels. Compared to liquid fuels, gaseous fuels do not provide much dampening of the valve needle as it closes. For a fuel injection valve that injects a liquid fuel, the liquid fuel that is squeezed from between the valve member and its valve seat helps to dampen the closing action of the valve needle to further reduce impact forces upon closing. The value of "squeeze films" is well understood in literature on liquid lubrication. A gaseous fuel is defined herein as a fuel that is in the gaseous phase when it is flowing through and out of the injection valve. Accordingly, compared to fuel injection valves intended for liquid fuels, for injecting gaseous fuels there is a greater need for an improved method of closing a fuel injection valve and reducing the impact upon closing. FIG. 8 shows the large variation in fluid density between various liquids and gases. In the case of hydrogen, the density difference approaches two orders of magnitude, versus liquid fuels.

SUMMARY OF THE INVENTION

A method is disclosed of operating a directly actuated valve that comprises a strain-type actuator operable by an actuator driver to actuate a valve member to travel between a closed position in which the valve member contacts a valve seat and an open position in which the valve member is spaced apart from the valve seat. The method comprises transmitting displacements from the strain-type actuator to the valve member, maintaining a compressive stress on the actuator that is greater than a predetermined minimum stress by applying a pre-load compressive stress to the actuator and limiting to less than predetermined limits at least one of: (a) acceleration and deceleration of the valve member when moving between the open positions and the closed position; and (b) velocity of the valve member immediately before contacting the valve seat. In preferred embodiments the method further comprises applying the pre-load compressive stress mechanically from a spring. The strain-type actuator can comprise a piezoelectric element, in which case the pre-load compressive stress is preferably greater than or equal to 4 MPa, and the predetermined minimum stress that is maintained on the actuator is preferably at least 1 MPa. In other embodiments, the strain-type actuator can comprise a magnetostrictive element, in which case the pre-load compressive stress is preferably between 10 MPa and 14 MPa and the predetermined minimum stress that is maintained on the actuator is preferably at least 5 MPa. Different pre-compressive stresses are preferred depending upon the type of strain-type actuator but in all embodiments it is important to maintain compressive stress above a predetermined minimum to prevent damage to the actuator from oscillating stresses. With piezoelectric actuators, lower compressive stresses are adequate because the displacement produced by a piezoelectric actuator is substantially the same within the practical range of preloaded compressive stress. However, with magnetostrictive materials it has been found that there is a range of compressive stress in which higher displacements are possible.

The method preferably further comprises reducing velocity of the valve member immediately before contacting the valve seat to less than one (1.0) meter per second. Reducing the velocity of the valve member reduces impact wear on the valve member, shock waves transmitted to the actuator and the likelihood of the valve member bouncing off the valve seat. In addition, the method preferably further comprises limiting acceleration and deceleration of the valve member so that the compressive stress on the actuator is maintained above the predetermined minimum stress. In some embodiments, limiting acceleration and deceleration permits a lower pre-load compressive stress, because such limits reduce the magnitude of oscillating stresses transmitted to the actuator from the movements of the valve member.

A preferred method of operating a directly actuated valve that comprises a strain-type actuator relates to controlling how the valve member travels between a closed position in which the valve member contacts a valve seat and an open position in which the valve member is spaced apart from the valve seat. The actuator is operable by an actuator driver to actuate a valve member. The method comprises transmitting displacements from the strain-type actuator to the valve member, applying a pre-load compressive stress to the actuator that maintains a compressive stress on the actuator that is greater than a predetermined minimum stress and actuating the valve member a closing distance from the open position to the closed position by shaping a signal from the actuator driver so that for a first part of the signal when the valve member travels a majority of the closing distance the signal changes in magnitude at a first rate averaged over time that is higher than a second rate averaged over time during a second part of the signal, which ends when contact between the valve member and the valve seat is restored. The signal can be shaped to have at least two distinct slopes of signal magnitude plotted against time, with the first part of the signal having a steeper slope than the second part. Depending upon the capabilities of the actuator driver, the signal can have a constant slope in the first part and a constant slope in the second part. The signal can be shaped to have at plurality of distinct slopes. For example, if three distinct slopes are employed, a first segment can have the steepest slope and successive slopes can be progressively shallower. While the slopes in each segment can be distinct, it is preferable to avoid changes in slope that are too abrupt since this can generate stress oscillations which are transmitted back to the actuator. In other embodiments, the signal can be step-shaped over time with consecutive steps in the first part having a greater change in signal magnitude from one step to the next step compared to consecutive steps in the second part. In yet another embodiment, the actuator driver signal can be shaped to follow a continuous curve with a steep first part that transitions into a shallow second part. For example, the actuator driver signal can be shaped as a function of 1/x where x is time.

When it is desirable to close the valve quickly, the method preferably further comprises commanding a time duration for the first part that is less than 0.1 milliseconds. Since most of the closing distance is traveled during the first part, the valve is almost closed at the beginning of the second part and fluid flow through the valve is diminished during the second part, which can have a longer duration than the first part. The fluid mass flow rate flowing through the directly actuated valve during the second part is preferably limited to less than 20% of a designed maximum fluid mass flow rate through the directly actuated valve. In preferred embodiments, the method further comprises commanding a time duration for the second part that is less than 0.9 milliseconds. The method can further comprise limiting acceleration of the valve member to less than a predetermined value during the first part of the signal and limiting deceleration of the valve member to less than a predetermined value when transitioning from the first part of the signal to the second part of the signal. The method can also further comprise limiting absolute velocity of the valve member to less than a predetermined velocity.

In a preferred application the directly actuated valve can be employed to regulate flow of a process fluid that is in a gaseous phase when it flows between the valve member and the valve seat. The method can further comprise using the directly actuated valve to inject a fuel into an internal combustion engine, and in preferred embodiments the fuel can be injected from the directly actuated valve directly into a combustion chamber of the internal combustion engine. The engine can be a high compression engine with a compression ratio of at least 10:1, and more preferably a compression ratio of at least 14:1.

If the strain-type actuator comprises piezoelectric elements, the actuator driver controls voltage that is applied to the piezoelectric elements and the method comprises programming the actuator driver to change voltage magnitude to change the displacement produced by the actuator. If the strain-type actuator comprises a magnetostrictive member, the actuator driver controls electrical current that is applied to an electromagnetic coil to change the strength of a magnetic field directed through the magnetostrictive member and the method comprises programming the actuator driver to change electrical current magnitude to change the displacement produced by the actuator. An advantage of these strain-type actuators is that using the actuator driver, the displacements produced by the actuators can be controlled to command the valve member to intermediate positions between zero displacement and the maximum displacement, in addition to being able to control the speed and acceleration of the valve member.

For practicing the method a directly actuated valve comprises: a valve body comprising a nozzle end and fluid passages within the valve body for delivering a process fluid from a supply rail to a nozzle cavity disposed within the nozzle end; a valve member disposed within the valve body and movable between a closed position in which process fluid is blocked from flowing from the nozzle cavity to at least one nozzle orifice when the valve member is seated against a valve seat associated with the nozzle end, and open positions in which process fluid can flow from the nozzle cavity through the at least one nozzle orifice when the valve member is lifted away from the valve seat; a strain-type actuator pre-loaded with a compressive stress, the strain-type actuator being activatable to produce linear displacements by having a length that changes responsive to an actuator signal; a transmission element that transmits the linear displacements from the strain-type actuator to the valve member; an actuator driver programmed to modulate the actuator signal to cause the valve member to move between the open positions and the closed position and control acceleration and deceleration of such movements to not cross predetermined limits and whereupon when moving the valve member in a closing movement from one of the open positions to the closed position, the actuator signal changes in magnitude at a higher rate at the beginning of the closing movement compared to near the end of the closing movement. The actuator driver can be programmed with predetermined signals for the closing movement whereby the valve member accelerates towards the closed position during a first part of the closing movement and decelerates during a second part of the closing movement, the first part having a time duration of less than 0.1 millisecond, and the second part having a time duration of less than 0.9 millisecond. The actuator driver can also be programmed to limit absolute velocity of the valve member to less than a predetermined velocity. The timing for ending the first part and beginning the second part is preferably predetermined to limit process fluid mass flow rate through the valve during the second part to less than 20% of the designed maximum fluid mass flow rate through the directly actuated valve.

In preferred embodiments the strain-type actuator comprises at least one piezoelectric element or a magnetostrictive member disposed proximate to an electromagnetic coil. The strain-type actuator is preferably pre-loaded with a compressive stress of at least 4 MPa for a piezoelectric actuator and between 10 MPa and 14 MPa for a magnetostrictive actuator.

The directly actuated valve can be employed to control the flow of a process fluid that is in the gaseous phase when it flows between the valve member and the valve seat. In a preferred embodiment, the directly actuated valve is an injection valve and the valve member is movable inward and away from the nozzle end to open and the nozzle end comprises orifices downstream from where the valve member contacts the valve seat whereby the process fluid can be sprayed from the orifices when the valve member is lifted away from the valve seat. The nozzle end can be shaped with a sac in the nozzle end.

The transmission element can comprise a passive hydraulic link. In some embodiments the passive hydraulic link can be filled with a hydraulic fluid that is a dilatant fluid. The passive hydraulic link comprises a piston disposed within a cylinder and can further comprise at least one orifice provided through the piston, fluidly connecting a space on one side of the piston to an opposite side of the piston. When one or more orifices are employed through the piston, piston ring seals are preferably disposed between the piston and the cylinder to prevent hydraulic fluid from by-passing the orifice(s) by flowing between the piston and cylinder.

The disclosed directly actuated valve is suitable for injecting fuel into an internal combustion engine, so in preferred embodiments the process fluid is a fuel that is combustible in an internal combustion engine. The nozzle end of the valve can be adapted to be installed in a combustion chamber of the internal combustion engine so that the fuel is injectable directly into the combustion chamber.

In another preferred embodiment a directly actuated valve comprises a valve body comprising a nozzle end and fluid passages within the valve body for delivering a process fluid from a supply rail to a nozzle cavity disposed within the nozzle end, a valve member disposed within the valve body and movable between a closed position in which process fluid is blocked from flowing from the nozzle cavity to at least one nozzle orifice when the valve member is seated against a valve seat associated with the nozzle end, and open positions in which process fluid can flow from the nozzle cavity through the at least one nozzle orifice when the valve member is lifted away from the valve seat, a strain-type actuator pre-loaded with a compressive stress maintained greater than a predetermined minimum stress, the strain-type actuator being activatable to produce linear displacements by having a length that changes responsive to an actuator signal, a transmission element that transmits the linear displacements from the strain-type actuator to the valve member, and an actuator driver programmed to modulate the actuator signal to cause the valve member to move between the open positions and the closed position and to limit to less than predetermined limits at least one of: (a) acceleration and deceleration of the valve member when moving between the open positions and the closed position; and (b) velocity of the valve member immediately before contacting the valve seat. In this embodiment a spring disposed between the valve body and the strain-type actuator can be employed to apply the compressive stress to the strain-type actuator. The transmission element can comprise a passive hydraulic link and in a preferred embodiment the hydraulic link can be filled with a hydraulic fluid that is a dilatant fluid. Like in other embodiments the passive hydraulic link can comprise a piston disposed within a cylinder and at least one orifice provided through the piston, fluidly connecting a space on one side of the piston to an opposite side of the piston. Furthermore, like other preferred embodiments when moving the valve member in a closing movement from one of the open positions to the closed position the actuator driver is preferably programmed to reduce the magnitude of the actuator signal at a higher rate at the beginning of the closing movement compared to near the end of the closing movement.

BRIEF DESCRIPTION OF THE DRAWINGS

The directly actuated valve and method of operating it can be better understood with reference to the figures, which illustrate preferred arrangements of the valve and illustrative actuator signal shapes for implementing the presently disclosed method.

DETAILED DESCRIPTION OF PREFERRED EMBODIMENT(S)

Figure 1:
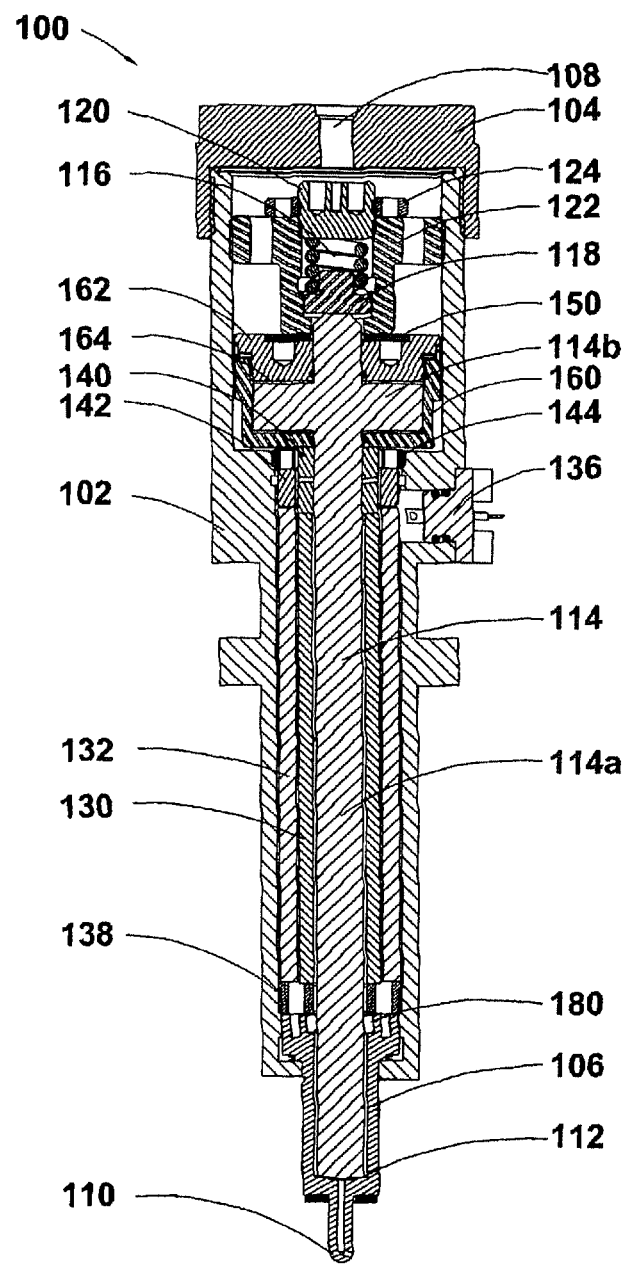
FIG. 1 is a schematic view of a directly actuated fuel injection valve with a magnetostrictive actuator.
Figure 2:
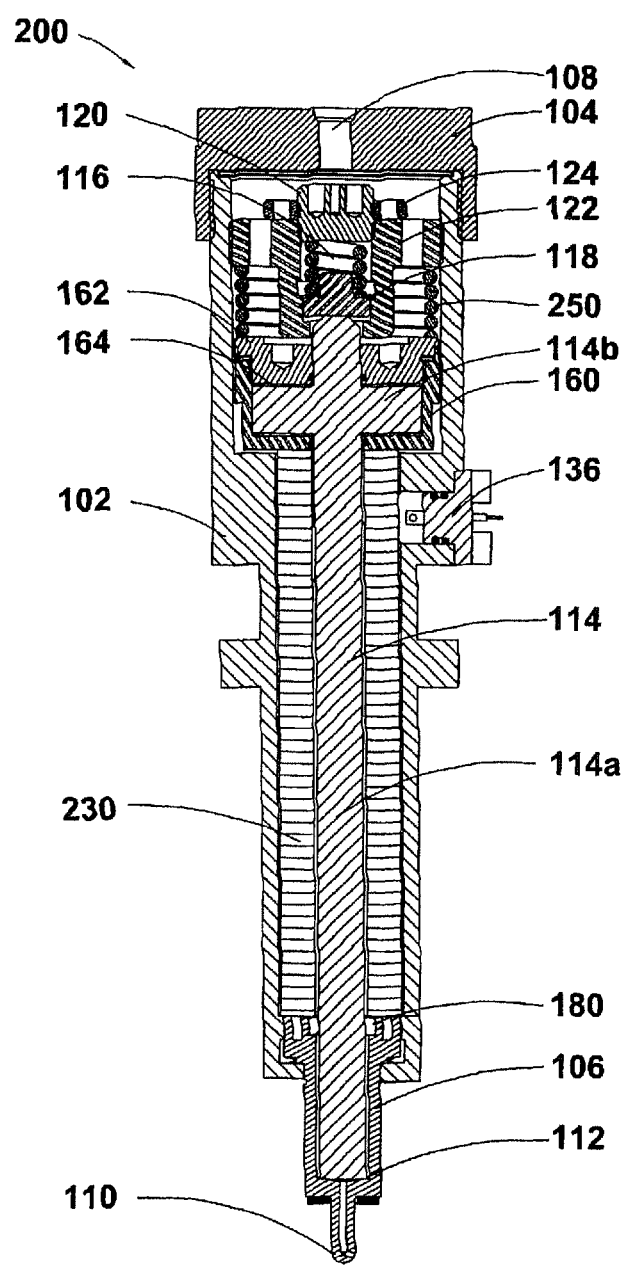
FIG. 2 is a schematic view of a directly actuated fuel injection valve with a piezoelectric actuator.

FIGS. 1 and 2 show two preferred embodiments of directly actuated fuel injection valves 100 and 200, respectively, which can be used to inject fuel into the combustion chamber of an internal combustion engine. These examples of directly actuated injection valves with strain-type actuators are described in detail to illustrate the difference between injection valves of this type versus conventional electro-hydraulically actuated injection valves, which can use strain-type actuators to operate the hydraulic control valves. This distinction is important because the presently disclosed method of closing a directly actuated valve addresses technical challenges associated with directly actuated valves that employ strain-type actuators, and the disclosed method is applicable specifically to valves of this type. While it is known that injecting fuel into a combustion chamber is an application that is particularly suited for the presently disclosed valve, it is also understood that valves with the disclosed features could be advantageously employed for other applications.

For example, a directly actuated valve with a strain-type actuator could be employed to inject fuel into an intake air manifold instead of directly into a combustion chamber, or to inject fuel into a fuel cell manifold, or for dosing a fluid in an industrial process when precise timing and/or quantities for dosing the fluid is important.

With reference now to FIG. 1, fuel injection valve 100 includes elongated valve housing 102 that cooperates with valve cap 104 and valve tip 106 to provide a fluidly sealed valve body. Persons skilled in the technology will understand that FIG. 1, being a schematic view, is not drawn to scale and does not show physical details such as how the valve body can be made from a plurality of pieces. Resilient ring seals and gaskets can be employed to ensure that the assembled valve body is fluid-tight and some valve body pieces can be abutted to each other with metal-to-metal sealing surfaces that are machined smooth to achieve a fluid-tight seal. Valve cap 104 comprises inlet port 108 through which fuel enters the valve body, and valve tip 106 comprises at least one nozzle orifice 110 through which fuel exits the valve body. Valve tip 106 further comprises valve seat 112 which cooperates with opposite surfaces of valve needle 114 to block fuel flow through nozzle orifice 110 when valve needle 114 is pressed against valve seat 112.

Valve needle 114 comprises valve stem 114a, which moves into an open position by moving inward within the valve body to lift away from valve seat 112. Valve stem 114a is a cylindrical member and since the valve lift is generally small (for example, only up to 250 micrometers for some directly actuated injection valves), the diameter of valve stem 114a is selected to ensure sufficient flow capacity through the valve opening since flow area is proportional to valve stem diameter (that is, flow area=$\pi \times$diameter$\times$lift). With strain-type actuators, displacement and the corresponding valve needle lift is a function of the length of the actuator elements. Hence, a smaller actuator, and a small lift can be compensated for by a larger needle diameter. Compared to the end with nozzle orifice 110, nozzle tip 106 includes a portion with a relatively large diameter to accommodate the diameter of valve needle 114. In preferred embodiments it is desirable to locate valve seat 112 close to nozzle orifice 110 to reduce the volume of the passage between the seat and the orifices to improve control over the precise amounts of fuel injected and the dispersion of such fuel when it is injected.

In an alternative arrangement (shown in co-owned U.S. Pat. No. 6,575,138), a poppet-type valve tip can be used so that downward movement of the valve needle causes it to open. In this alternative arrangement, the actuator assembly is preferably positioned above the valve needle so that when the actuator is energized to expand in length, it opens the injection valve by applying a downward displacing force to the valve needle. Persons skilled in the technology will understand that the methods and features disclosed herein can be adapted and applied to valves with this alternative arrangement to achieve similar results.

A spring assembly biases valve needle 114 in the closed position. In a preferred arrangement, the spring assembly comprises at least one needle spring 116. With reference to the embodiment of FIG. 1, the spring assembly further comprises a needle spring guide 118 for evenly transmitting the closing force from needle spring 116 to valve needle 114. Needle spring 116 is held in compression by needle spring adjuster 120, which cooperates with needle spring housing 122 to provide a load path to valve housing 102. In a preferred arrangement, respective threaded surfaces join needle spring adjuster 120 to needle spring housing 122, and needle housing 122 to valve housing 102. After needle spring adjuster 120 has been rotated to compress needle spring 116 to provide the desired closing force to needle spring 116, locking nut 124 is tightened to prevent needle spring adjuster 120 from loosening.

An actuator assembly is activated to provide an opening force that is opposite and greater than the closing force provided by the spring assembly. In the embodiment illustrated in FIG. 1, the actuator assembly comprises a magnetostrictive member that expands in the direction of the opening force when the member is exposed to a magnetic field. Magnetostrictive member 130 has a crystalline lattice that deforms when subjected to a magnetic field, with the amount of deformation being a function of the strength of the magnetic field. The magnetic field dissipates when electric coil 132 is de-energized. In FIG. 1, the actuator comprises magnetostrictive member 130, and electric coil 132 disposed around the outer diameter of magnetostrictive member 130. An electric current is supplied to electrical fitting 136. Electric leads (not shown) conduct the electric current from electrical fitting 136 to electric coil 132. When an electric current is applied to electric coil 132 a magnetic field develops that flows through magnetostrictive member 130, and pole 138, 140 and 142. Poles 138, 140 and 142 are made from a suitable material such as carbon steel (for example CS 1018) or steel that has a low magnetic hysteresis. Pole 138 is a "fixed" pole that provides a structural support for a first end of magnetostrictive member 130 and electric coil 132. Pole 140 is associated with a second end of magnetostrictive member 130 and pole 142 is associated with a second end of electric coil 132. Pole 140 is an "inner" pole and pole 142 is an "outer" pole disposed concentrically around inner pole 140. Pole 142 and electric coil 132 are held in place by lock nut 144, which preferably threads into the inner wall of valve housing 102. Poles 140 and 142 cooperate with one another to provide a flux path for the magnetic field at the second end of the actuator assembly, but pole 140 can move relative to pole 142 so that magnetostrictive member 130 can expand in the direction of the magnetic field which is oriented so that the actuator assembly provides an opening force in opposition to the closing force of the spring assembly.

It is known to apply a pre-compression force to a magnetostrictive member to amplify the magnitude of expansion when a magnetic field is applied. Pre-compression of magnetostrictive member 130 mechanically compresses the crystalline lattice, increasing the available net displacement per unit of applied magnetic field. When a pre-compression force is employed, the actuator's displacement can increase to about 0.13% of the total length of magnetostrictive member 130. However, as disclosed herein, there are also other reasons to apply a compressive stress to the actuator, such as preventing tensile stresses from developing in the actuator, and maintaining contact between the actuator assembly and the hydraulic link assembly. Accordingly, in preferred embodiments the compressive stress applied to the actuator assembly is predetermined to balance all of the factors that benefit from maintaining a compressive stress on the actuator, and taking into account all contributors to the compressive stress, including spring 150, the pressure of the fuel, and the effect of activating the actuator in the course of operation. Accordingly, it is hereby taught that once the predetermined compressive stress is determined, then limits are set on the commanded acceleration, deceleration and velocity of the valve needle movements responsive to the predetermined compressive stress. That is, while spring 150 is only one contributor to the overall compressive stress, when a valve is designed, spring 150 can be provided with a selected spring force to deliver the desired overall compressive stress that is needed to achieve the desired performance characteristics, including achieving the desired displacement, preventing tensile stress from developing in the actuator assembly, and maintaining contact between the actuator assembly and the passive hydraulic link assembly disposed between the actuator assembly and the valve needle. Different from prior art valves which simply taught closing the valve as quickly as possible with some acknowledgment of the need to reduce impact forces between the valve needle and the needle seat, the method and apparatus disclosed herein teaches that there is a relationship between the predetermined compressive stress applied to the actuator assembly and valve needle acceleration, deceleration and velocity, and that these variables need to be limited during the opening and closing valve needle movements to prevent over-stressing the actuator and valve components.

By way of example, in FIG. 1, disc spring 150 is shown as the component that applies a pre-compression force to the actuator assembly. In other embodiments, different compression elements can be substituted in place of disc spring 150 to provide a compression force, such as, for example, a coil spring (shown in the embodiment of FIG. 2) or another type of spring with the same spring force, a hydraulic piston, or a combination of compression elements.

As shown in FIG. 1, the actuator assembly in this embodiment is located within valve housing 102 and disposed concentrically around valve stem 114a where it occupies a portion of the annular space between valve stem 114a and valve housing 102. This arrangement is suitable when the fuel is compatible with the actuator since the actuator assembly is exposed to fuel that is directed through the hollow valve body on its way from inlet port 108 to nozzle orifice 110.

In preferred embodiments, the opening force generated by the actuator assembly is transmitted to valve needle 114 through a passive hydraulic link assembly. The passive hydraulic link assembly comprises hydraulic cylinder 160, which is disposed in close-fitting relationship around hydraulic piston 114b, which is free to move in the longitudinal direction within cylinder 160. As mentioned above, in the embodiment of FIG. 1, hydraulic piston 114b is an integral part of valve needle 114 and the side wall of cylinder 160 helps to guide the movement of valve needle 114 in the actuating direction. A viscous hydraulic fluid is sealed inside hydraulic cylinder 160 by cylinder cap 162 and seals 166, 168 and 169 (see FIG. 2). Seals 166 and 168 permit valve needle 114 to move relative to cylinder cap 162 and cylinder 160, respectively. Known seals can be employed, such as, for example elastomeric O-ring seals, packing, metal seals, or diaphragm/bellow seals.

The diametrical clearance gap between the outside diameter of hydraulic piston 114b and the inside diameter of hydraulic cylinder 160 is extremely small (on the order of 50 to 250 microns in some embodiments). The desired size of the clearance gap is dependent on the viscosity of the chosen hydraulic fluid. The hydraulic flow in the clearance gap is governed by the Hagen-Poiseuille Flow Law and the hydraulic fluid properties. The clearance gap is preferably selected so that the flow of hydraulic fluid through the gap is insignificant during the time span of fuel injection events when an opening force is transmitted through the hydraulic fluid. Furthermore, the hydraulic fluid preferably has a sufficiently high viscosity and bulk modulus so that it acts as an incompressible solid when activation of the actuator assembly causes a valve opening force to be quickly transmitted through the hydraulic fluid disposed between the bottom of cylinder 160 and hydraulic piston 114b. For consistency of operation, the hydraulic fluid is also preferably an extremely stable fluid that maintains its desired properties over a wide range of temperatures (that is, within the expected operating temperatures inside cylinder 160). Suitable hydraulic fluids are, for example, conventional motor oil, such as grade 15W40, or synthetic lubricants such as DuPont® "Krytox®" oil or grease which is available in a range of viscosities. Krytox® is a PerFluoroPolyEther (PFPE) synthetic lubricant that can be mixed with a thickener to form a grease. These types of hydraulic fluids also help to lubricate seals 166 and 168. In other embodiments, the hydraulic fluid can be a non-Newtonian dilatant fluid, such as, for example, a copolymer dispersion with long-term constancy of its chemical and physical properties and that is otherwise compatible with the expected operating conditions. For a fixed static pressure and temperature, Newtonian fluids have a constant viscosity, whereas non-Newtonians have a viscosity that is a function of shear stress. With a dilatant fluid, viscosity increases with increasing shear rate. A fluid can be defined as a substance that undergoes continuous deformation when subjected to a shear stress. A dilatant fluid suitable for use as the hydraulic fluid for the subject passive hydraulic link has a viscosity that increases so that it behaves less like a fluid and more like a solid when subjected to high shear stresses associated with a sudden impact pressure and the associated elevated fluid strain rate, when the valve is actuated. Advantages of using a dilatant fluid for the hydraulic fluid is that the lower viscosity of the dilatant fluid when not subjected to high shear loads allows the fluid to flow easily from one side of the piston to the other at times when the valve is not actuated, while also facilitating assembly during manufacturing. Lower surface tension is also a desirable property because it benefits the manufacturing process by reducing the tendency to have trapped gas bubbles that can be associated with some assembly techniques. A larger gap between hydraulic piston 114b and cylinder 160 is possible because when the valve is actuated, the apparent viscosity of the dilatant fluid increases, limiting flow through the gap, and a larger gap further facilitates manufacturing and assembly. Similar to a dilatant fluid, the hydraulic fluid can be other fluids with a variable viscosity or a variable flow resistance, such as so-called "smart fluids". Smart fluids are defined herein to mean fluids which have a viscosity or a flow resistance that can be controlled to be different values at different times, with a higher viscosity or resistance to flow when the valve is open and a lower viscosity or resistance to flow when the valve is closed. For example, the viscosity of a magnetorheological fluid or a ferrofluid increases when a magnetic field is applied because small magnetic dipoles suspended in a non-magnetic fluid line up and form strings that increase the viscosity when a magnetic field is applied. The difference between magnetorheological fluids and ferrofluids is the size of the magnetic particles with magnetorheological fluids typically having particles sized in the range of 0.1 to 10 micrometers and ferrofluids having nanoscale ferromagnetic or ferromagnetic particles suspended in a carrier fluid. Another type of smart fluid is an electrorheological fluid which has a yield stress point that changes to increase flow resistance when an electric field is applied to it With an electrorheological fluid the viscosity does not change, but the flow resistance changes by altering the yield stress point, which has the same effect if deployed as the hydraulic fluid in a hydraulic link assembly. In the disclosed passive hydraulic link application, the objective is to control fluid flow so that the hydraulic fluid does not flow and acts as a solid in terms of having constant dimensions through which actuating forces can be transmitted when the actuator is activated. Between injection events when the actuator is not activated a lower viscosity or lower resistance to flow is desired so that the hydraulic fluid can re-distribute itself and re-zero the hydraulic link assembly when the hydraulic fluid flows freely from one side of the hydraulic piston to the other side.

Accordingly, different valves can be designed to employ passive hydraulic links with different sized pistons and clearance gaps, with the size of the clearance gap depending upon the selected hydraulic fluid, its viscosity and whether or not it has a variable viscosity such as, for example, a dilatant fluid, a magnetorheological fluid or a ferrofluid, or a variable flow resistance such as a electrorheological fluid.

When injection valve 100 is closed and at rest, the closing force is transmitted from spring 116 to valve needle 114, and disc spring 150 pushes cylinder cap 162 and hydraulic cylinder 160 down and into contact with the actuator assembly, whereby hydraulic fluid held between cylinder cap 162 and hydraulic piston 114b can be pushed through the clearance gap between hydraulic piston 114b and hydraulic cylinder 160, so that the space between hydraulic piston 114b and the bottom of hydraulic cylinder 160 is kept filled with hydraulic fluid. The effect of the spring to positively displace hydraulic fluid from the upper side of the piston to the lower side is an advantage of the illustrated preferred embodiments which utilize a passive hydraulic link assembly that comprises a hydraulic piston that divides a hydraulic cylinder into two chambers with hydraulic fluid disposed on both sides of hydraulic piston. Typically, during engine operation, injection valve 100 is closed most of the time (normally over 90% of the time). Accordingly, there is enough time between injection events for the hydraulic fluid to redistribute itself by flowing through the clearance gap so that hydraulic cylinder 160 moves relative to hydraulic piston 114b to automatically "re-zero" itself relative to hydraulic cylinder 160. After injection valve 100 is assembled, the initial zero-position of hydraulic piston 114b within hydraulic cylinder 160 is its position when valve needle 114 is seated, the actuator is not energized, and cylinder 160 is urged into contact with pole 140 which is in turn urged into contact with magnetostrictive member 130. The initial zero-position of piston 114b relative to cylinder 160 need not be exactly the same for all injectors due to variation in the length of components made within specified manufacturing tolerances. Also, during operation, the zero-position auto-adjusts to change depending, for example, upon component wear or upon the effects of thermal expansion on the dimensional relationship between components.

Differential thermal expansion or contraction can be caused by differences in thermal expansion coefficients or uneven heat distribution between the components. Even though the components of injection valve 100, such as magnetostrictive member 130, valve needle 114, and valve housing 102, are preferably designed to be reasonably matched to the thermal expansion rates of the other components, because the valve needle lift and the displacement of the components that causes the lift are so small, the effects of thermal expansion or contraction need to be taken into account to ensure the desired valve needle lift is achieved. The effects of thermal expansion and contraction can be amplified if the injection valve is exposed to a wide range of temperatures. For injection valves used in vehicles it would not be uncommon to expect a temperature range between −40° C. (in cold climates) and +125° C. (when the engine is running). An uneven temperature distribution can be the result of many factors, including, for example, the influence of (1) heat generated at coils 132; (2) magnetic, mechanical or electrical hysteresis in the actuator assembly; and (3) heat transfer from the cylinder head or the combustion chamber via valve tip 106 and whether the combustion chamber is in the middle or end of a cylinder bank. If unaccounted for, the total effect of differential thermal expansion or contraction on the displacement of valve needle 114 can be greater than the targeted lift.

Accordingly, the hydraulic link assembly accounts for variations in component dimensions arising from the permitted tolerances in the manufacturing processes and the injection valve assembly methods. Therefore, the hydraulic link assembly reduces manufacturing costs by allowing the injection valve components to be manufactured to less exacting tolerances. In addition, during operation, the hydraulic link assembly auto-adjusts itself between injection events to account for changes in the dimensional relationship between injection valve components that can be caused, for example, by component wear or differential thermal expansion or contraction.

To initiate an injection event the actuator assembly is energized by directing an electric current to electric coil 132. A magnetic field develops that flows through magnetostrictive member 130, and poles 138, 140, and 142. Under the influence of the magnetic field, magnetostrictive member 130 expands in length (in the direction of the magnetic field). Since pole 138 is held in a fixed position, magnetostrictive member 130 expands in the direction of hydraulic cylinder 160. An opening force, originating from expanding magnetostrictive member 130 is transmitted through inner pole 140, the base of cylinder 160, and the hydraulic fluid, which is held between the base of cylinder 160 and the underside of hydraulic piston 114b, and finally, through hydraulic piston 114b itself, which in the illustrated embodiment is integral with valve needle 114. The opening force is greater than the closing force, which results in compression of needle spring 116. The displacement of hydraulic cylinder 160 also causes further compression of disc spring 150.

As previously discussed, because valve actuation occurs suddenly (on the order of 200 μs), hydraulic fluid disposed between hydraulic piston 114b and the base of cylinder 160 does not have time to flow through the narrow clearance gap between hydraulic piston 114b and hydraulic cylinder 160. Instead, the hydraulic fluid behaves more like a solid in that its dimensional thickness is substantially constant, and transfers the movement of magnetostrictive member 130 to valve needle 114 via hydraulic piston 114b, causing valve needle 114 to lift away from valve seat 112. Because injection valve 100 stays open for such a brief period (typically less than 3 milliseconds), as long as the viscosity of hydraulic fluid 164 is properly selected and the clearance gap is suitably sized, the flow of hydraulic fluid 164 through the clearance gap while injection valve 100 is open is insignificant so that displacement caused by such flow is much less than the total displacement of valve needle 114. If the hydraulic fluid is a non-Newtonian dilatant fluid, it is the fluid's own properties that cause it to behave like a solid with a fixed thickness when subjected to sudden impact pressure and an elevated fluid strain rate. While a fuel injection valve is disclosed herein as an illustrative example, valves used for other purposes can also use a passive hydraulic link assembly by recognizing the operational pattern for opening and closing the valve and then appropriately sizing the flow area of the restriction between opposite sides of the piston and selecting a hydraulic fluid with suitable properties so that there is no significant hydraulic fluid flow while the valve is open.

The movement of valve needle 114 is guided near valve tip 106 by guide 180. Between injection events, fuel remains in the annular space between valve needle 114 and housing 102 and valve tip 106. When injection valve 100 is open, fuel flows through the annular space, and fluid passages between and provided through valve components, which all cooperate to permit the free flow of fuel from inlet port 108 through to nozzle orifice 110 (which can be one of a plurality of nozzle orifices radially oriented from the nozzle throat).

To close injection valve 100, at the end of the injection event, electric coil 132 is de-energized, causing magnetostrictive member 130 to contract. By controlling the rate of reducing the current directed to electrical coil 132, the rate of contraction can be controlled to guide the acceleration and deceleration of the valve needle as it accelerates at the beginning of the closing movement and decelerates near the end. As explained in more detail below, as the actuator contracts, needle spring 116 and disc spring 150 expand to maintain contact between valve needle 114 and the passive hydraulic cylinder link and between the passive hydraulic cylinder link and the actuator assembly. When valve needle 114 is moving from the open position to the closed position, the closing force applied to the needle originates primarily from needle spring 116 with disc spring 150 capable of exerting some force in the closing direction on hydraulic piston 114b through cylinder cap 162 and the hydraulic fluid disposed therebetween. When valve needle 114 moves from the open position to the closed position, the time that elapses, like the opening movement, is again typically less than 250 microseconds, and preferably less than about 200 microseconds, so the hydraulic fluid again does not have time to flow through the clearance gap between hydraulic piston 114b and cylinder 160. Consequently, a closing force from disc spring 150 can be transmitted through the hydraulic fluid above hydraulic piston 114b between cylinder cap 162 and hydraulic piston 114b, in addition to the closing force from needle spring 116 that can be transmitted from downward moving hydraulic piston 114b and the hydraulic fluid between the piston and the bottom of hydraulic cylinder 160. Once valve needle 114 is seated against valve seat 112 and the passive hydraulic link re-zeroes its position, disc spring 150 does not normally apply any closing force to valve needle 114. The primary function of disc spring 150 is to exert a compressive force that maintains contact between hydraulic cylinder 160 and the actuator assembly and a compressive stress on the actuator assembly to maintain a predetermined minimum stress in the actuator. As cylinder cap 162 follows hydraulic piston 114b downwards, disc spring 150 de-compresses, expands, and provides the primary compressive force that pushes cylinder 160 toward the actuator assembly to contribute to maintaining a predetermined minimum compressive stress in magnetostrictive member 130.

Once valve needle 114 contacts valve seat 112, injection valve 100 is closed. When injection valve 100 is closed, the hydraulic link assembly automatically self-adjusts so that the position of hydraulic cylinder 160 relative to hydraulic piston 114b is corrected to account for the effects of temperature, wear, and small movements of valve needle 114 relative to hydraulic cylinder 160 that can occur when valve needle 114 is in the open position. Auto-adjustments are accomplished by the migration of hydraulic fluid 164 from one side of hydraulic piston 114b to the other, while disc spring 150 helps to urge hydraulic cylinder 160 and the actuator assembly into contact with each other at all times. Accordingly, the passive hydraulic link assembly is re-zeroed when valve needle 114 is seated, the actuator assembly is de-energized, and there is contact between the actuator assembly and the hydraulic cylinder 160, and the space between the hydraulic piston 114b and the bottom of the hydraulic cylinder is filled with hydraulic fluid.

The passive hydraulic link assembly is described herein as being "passive" because, as described above, the hydraulic link assembly is sealed and hydraulic fluid does not flow from one side of the piston to the other side during actuation of the fuel injection valve. In the short time when the needle is in an open position the hydraulic fluid does not flow and has substantially fixed dimensions, behaving more like a solid than a liquid in these respects. However, between injection events, hydraulic fluid does have sufficient time to flow through the clearance gap, changing the thickness of the hydraulic fluid held between hydraulic cylinder 160 and each side of hydraulic piston 114b, to auto-zero the position of cylinder 160 relative to piston 114b of the hydraulic link assembly. This is unlike more conventional hydraulic transmission mechanisms that use a piston to displace hydraulic fluid to actuate the valve, requiring hydraulic fluid to flow as it is displaced to open and close the valve.

FIG. 2 shows another embodiment of a fuel injection valve that is directly actuated by a strain-type actuator. In FIG. 2, components of fuel injection valve 200 that are the same in function as those components in the embodiment of FIG. 1 are identified by the same reference numbers. The main difference with this embodiment is that the strain-type actuator comprises piezoelectric elements 230 instead of a magnetostrictive member. Instead of being connected to an electromagnetic coil, electrical fitting 136 is used to connect wires (not shown) to piezoelectric elements 230 to apply a voltage to change the electric charge and produce an elongation of piezoelectric elements 230 to cause a corresponding longitudinal displacement of valve needle 114. The other difference is that coil spring 250 is employed instead of disc spring 150 to apply a pre-load and compressive force to the actuator and to maintain contact between hydraulic cylinder 160 and piezoelectric elements 230. In like manner, the same functionality can be achieved by replacing coil spring 116 with a disc spring if, for example, a more compact design is desired.

As shown in FIGS. 1 and 2, the spring that applies a compressive force to the actuator assembly is disposed where it can also exert a force on the valve needle when closing to urge it towards the seated position in concert with needle spring 116. That is, springs 150 and 250 can transmit closing forces to the needle through the hydraulic fluid disposed between cylinder cap 162 and hydraulic piston 114b, while applying a compressive stress to the actuator assembly and maintaining contact between hydraulic cylinder 160 and the actuator assembly. In preferred arrangements needle spring 116 is sufficiently strong to close the valve and the closing force contributed by springs 150 and 250 cooperates with needle spring 116 but is not required. The advantage of this arrangement is that needle spring 116 and compression springs 150 and 250 work in concert and not in opposition to each other. This is an advantage over prior art arrangements such as those taught by U.S. Pat. No. 4,725,002, in which the a first spring that 30 biases the actuator for contact with the valve needle works in opposition to a second spring that biases the valve needle closed. With this prior art arrangement the first spring must be much weaker than the second spring to prevent the first spring from overcoming the second spring and opening the valve when it should be closed. Because of the dynamic relationship during valve operation if the compression spring and needle spring do not work in concert it can be difficult to determine the optimal balance between these two springs for re-zeroing the hydraulic link assembly between injection events, and for the desired performance during all valve needle movements.

A directly actuated fuel injection valve that is actuated by a strain-type actuator is different from other types of valves that are actuated by other means, such as electro-hydraulic actuators or electromagnetic solenoid actuators, because strain-type actuators permit more control over the valve needle speed, acceleration and position, by shaping the actuator signal.

FIGS. 3 through 6 illustrate plots of actuator signal amplitude against time showing different approaches for controlling the closing movement of the valve needle from an open position. "Amplitude" is used herein to mean the same as signal magnitude because of the direct correlation between signal amplitude and valve needle displacement. As described herein, while each of the illustrated shapes is different, they all share a common strategy for closing a fuel injection valve. For a fuel injection valve with an actuator that comprises a magnetostrictive member, the electric current delivered to a coil for producing an electromagnetic field is what governs the displacement generated by the actuator, so the units for the signal amplitude are amps. For a fuel injection valve with an actuator that comprises piezoelectric elements, the units of measurement for the actuator signal amplitude is volts for the voltage that is applied to the piezoelectric elements. The different shapes illustrated in FIGS. 3 through 6 are functionally similar in that they achieve substantially the same result in substantially the same way. The chosen shape for the actuator signal can be selected depending upon the capabilities of the actuator driver.

Unlike previously known strategies, which taught closing the valve as quickly as possible in the shortest amount of time, or reversing the signal to slow down valve needle movements, the strategy presently disclosed herein relates to accelerating the closing movement at the beginning with a rapid decrease in signal amplitude to move the valve needle close to the valve seat and then slowing the change in signal amplitude to decelerate the valve needle and close it more slowly, to reduce impact on the valve seat, needle bounce, impact wear, and the shock transmitted through the valve needle to the actuator. The shape of the commanded amplitude has a first part where the valve needle travels most of the closing distance in a short amount of time. The second part of the valve closing movement can take longer, to allow the valve needle to decelerate before impacting the valve seat. A longer duration for the second part is acceptable because, compared to the amount of fuel that is injected during the first part, the amount of fuel that is injected during the second part is significantly less since the valve needle is close to the valve seat during the second part, restricting the fuel mass flow rate. Accordingly, the disclosed method teaches reducing the amplitude of the actuator signal at a first rate during the first part of the closing movement when the needle travels the majority of the distance, and in a second part of the closing movement, reducing the amplitude of the signal at a second rate, which is lower than the first rate. In both the first and second parts, the signal amplitude is always decreasing, with the valve needle accelerating towards the closed position during the first part and decelerating while still moving towards the closed position in the second part. Unlike conventional approaches, while the time for closing the valve is quick, the actuator signal is not shaped to move the valve needle towards the valve seat in the shortest amount of time. The second part of the closing movement is prolonged to allow the valve needle to decelerate and reduce impact when contacting the valve seat.

In preferred embodiments between the first part and the second part there is a distinct difference in the rate at which the actuator signal amplitude changes, but another important feature is limiting the rate of change in amplitude so that the valve needle can keep up with changes in the actuator displacement. Prior teachings do not disclose limiting the acceleration and deceleration to prescribed limits. In testing directly actuated injection valves it has been found that if the acceleration and deceleration is not limited, this can result in tensile stress in the actuator that can damage strain-type actuators. For example, excessive tensile stress can crack the strain-type elements of such actuators.

It is believed that the reflection of compression waves can cause fluctuations in the compressive forces applied to the actuator and be a source of tensile stress in strain-type actuators employed by directly actuated valves. For example, if the rapidly closing actuator suddenly halts, the moving valve components can "bounce" and reduce the pre-load on the actuator assembly and the inertia of the valve components (especially the hydraulic link assembly) continues to force the actuator to further compress—under such circumstances, "ringing" of the system at natural frequency can occur. Ringing is made up of alternating compression and expansion waves in the solid.

In addition, if the actuator contracts in length faster than the mechanical inertia of the passive hydraulic link and the valve needle, then the deceleration rate is too high, and in severe instances it is believed that gaps can form between the hydraulic cylinder and the actuator or between other transmission elements which separate from each other during actuation of the valve. When the valve needle contacts the valve seat, the gaps close and contact is restored between the transmission element(s), and the impact force can produce ringing that can result in potentially damaging tensile stress. This can be particularly harmful if the frequency of the ringing is at or near resonant frequency. A high compressive force applied to the actuator and the transmission elements by disc spring 150 or coil spring 250 can provide a pre-load that helps to reduce the likelihood of transmission elements separating and becoming spaced apart from actuator 130, 230. For preferred embodiments, a pre-load is applied to piezoelectric actuators to maintain a minimum compressive stress in the actuator of at least 1 MPa and more preferably 4 MPa or higher. If a magnetostrictive actuator is employed, in preferred embodiments, a higher preload can be applied to maintain a minimum compressive stress in the actuator of at least 5 MPa, with the pre-load preferably being between 10 MPa and 14 MPa, and more preferably between 10 MPa and 12 MPa. With a magnetostrictive actuator, in addition to reducing the effect of ringing, higher pre-loads in the disclosed ranges enable higher displacements. With piezoelectric elements, increasing the pre-load also reduces the effect of ringing but the displacement is substantially constant. An advantage of limiting acceleration and deceleration of the valve member and the actuator is that this approach provides a method of reducing the amount of preload required to maintain the desired minimum compressive stress on the actuator. That is, in preferred embodiments acceleration, deceleration and velocity of the valve needle and the transmission elements are limited responsive to the predetermined minimum compressive stress on the actuator, to keep the frequency of ringing below the resonant frequency.

Figure 3:
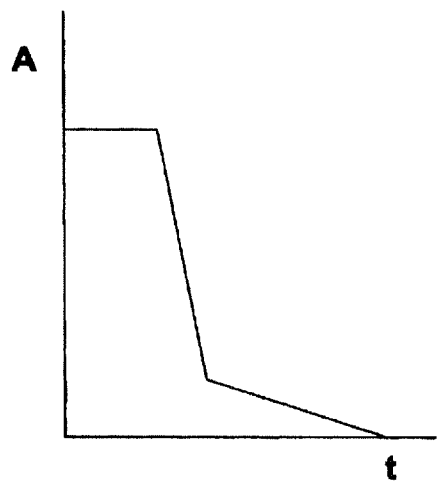
FIG. 3 is a graph that plots the actuator signal magnitude against time with a closing shape that comprises two slopes.

FIG. 3 shows an embodiment where the commanded actuator signal in the first part of the closing movement decreases quickly at a constant rate as shown by a sloped line. In the second part, the slope of the line changes to a shallower slope during which time the valve needle decelerates until it contacts the valve seat, with the second part taking a much longer time to complete compared to the first part.

Figure 4:
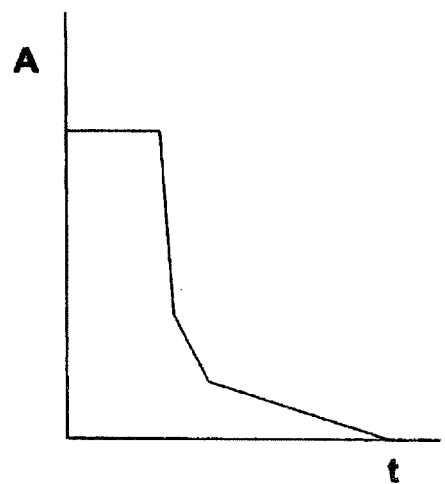
FIG. 4 is a graph that plots the actuator signal magnitude against time with a closing shape that comprises three slopes.

FIG. 4 illustrates another embodiment in which the commanded actuator signals follows a shape that comprises a plurality of sloped lines. Like in the other illustrated embodiments, most of the closing distance is traveled quickly during the first part of the closing signal and the intermediate segment between the first and last segments has an intermediate slope that helps the valve needle to transition smoothly from acceleration to deceleration.

Figure 5:
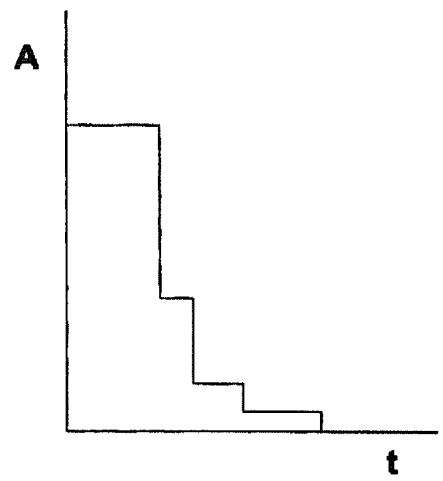
FIG. 5 is a graph that plots the actuator signal magnitude against time with a closing shape that comprises steps.

FIG. 5 illustrates an embodiment where the actuator signal amplitude is reduced in steps, but the same strategy is used to control the closing of the valve needle so that it begins by quickly accelerating the closing movement of the valve needle to travel most of the closing distance in the first part, and then slowing down the needle by commanding steps with smaller changes in amplitude in the second part of the closing signal.

Figure 6:
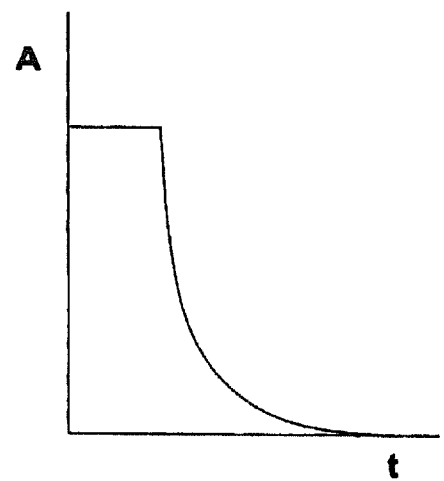
FIG. 6 is a graph that plots the actuator signal magnitude against time with a closing shape that is a continuous curve; and, FIG. 7 is a schematic view of another embodiment of a passive hydraulic link for a directly actuated valve, with an orifice that limits flow from one side of the piston to the other side.

In yet another example, FIG. 6 shows that the signal amplitude can be commanded to decline following a curved shape initially following a curve with a large radius, and gradually shifting to a curve with a smaller radius before shifting back to a larger radius as the valve needle contacts the valve seat. This curved shape also causes the valve needle to travel most of the closing distance during the first part of the closing signal, and then allows the valve needle to decelerate in the second part which can take a longer amount of time because the fuel mass flow rate is so much smaller during the second part because the valve needle is close enough to the valve to restrict fuel flow. This type of shape can be described as a function of 1/x where "x" is time.

Figure 7:
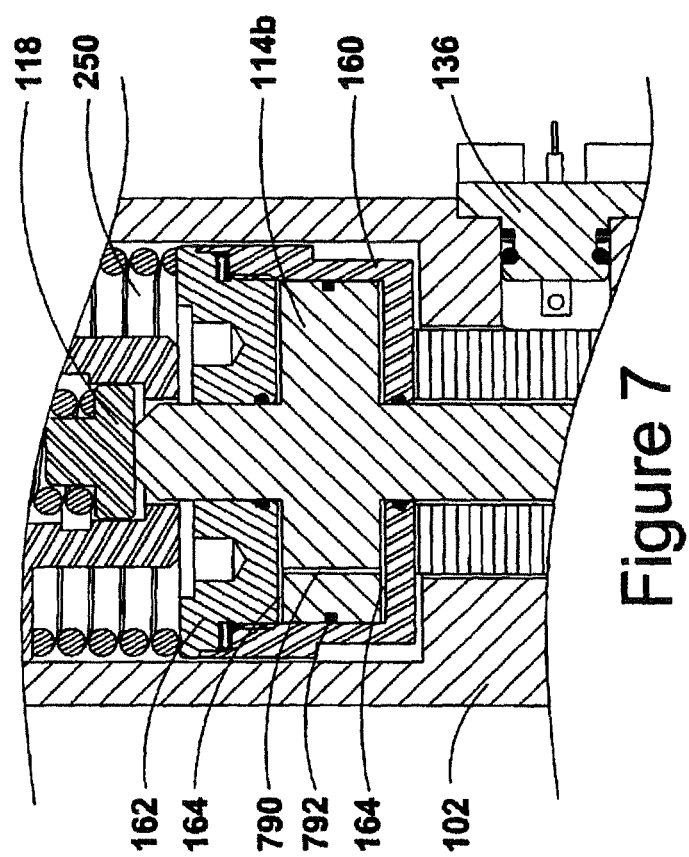
Figure 8:
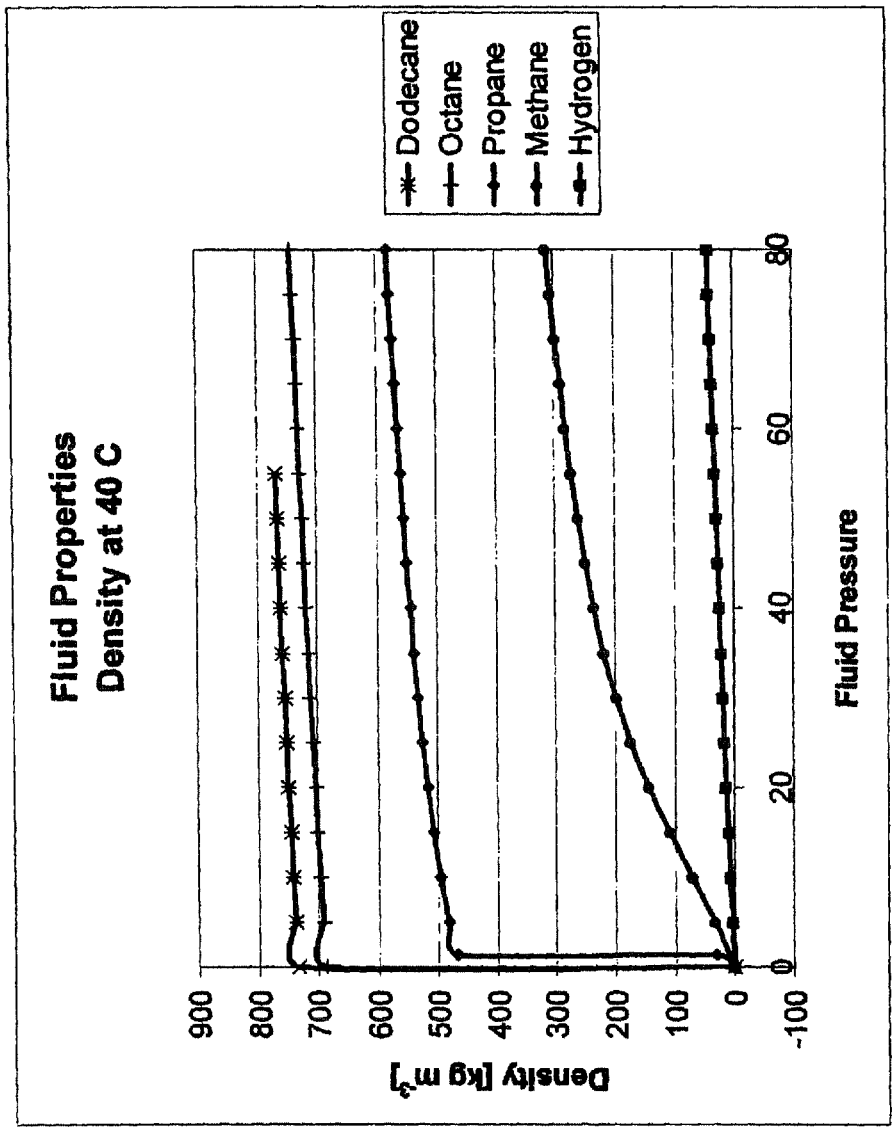
FIG. 8 is chart that illustrates the difference between the fluid density of gaseous fuels versus liquid fuels.

FIGS. 1 and 2 are preferred embodiments of fuel injection valves, which are directly actuated by strain-type actuators, with magnetostrictive and piezoelectric actuators, respectively. Modifications can be made to these examples while still employing a strain-type actuator to directly actuate the valve needle. FIG. 7 is a schematic view of another embodiment of a passive hydraulic link for a directly actuated valve, with orifice 790 sized to limit flow of hydraulic fluid 164 from one side of piston 114b to the other side. Orifice 790 can be one of a plurality of orifices to facilitate fluid flow as long as the combined flow area through the plurality of orifices provides the desired flow area for restricting fluid flow during valve actuation. In this embodiment, because hydraulic fluid 164 flows through orifice 790 and not through the gap between piston 114b and hydraulic cylinder 160, piston ring seals 792 can be used to prevent hydraulic fluid 164 from by-passing orifice 790. An advantage to this design is that it can be easier to manufacture a piston with a consistently sized orifice, compared to specifying manufacturing tolerances and then manufacturing a piston and cylinder with the requisite precision to produce a consistent gap size. To facilitate manufacturing, orifice 790 (or multiple orifices) can be manufactured separately, flow tested and sorted, and then installed in the hydraulic piston 114b with threads or interference fits. Seals such as O-ring or gasket type seals can be employed between the orifice insert and the hydraulic piston 114b to prevent leaks so that the hydraulic fluid can flow only through orifice 790. If multiple orifices are used, in preferred embodiments they are located symmetrically around the piston 114b so that forces and pressures are balanced.

A common characteristic of valves directly actuated by a strain-type actuator is the advantage of quick and precise actuation, including the ability to control the position of the needle during an injection event for shaping the mass flow rate, including valves that do not employ a passive hydraulic link or that use a mechanism for amplifying the displacement of the valve needle. However, unlike hydraulically actuated injection valves or electromagnetically actuated injection valves, a common challenge associated with directly actuated fuel injection valves, is that because opening and closing forces are transmitted directly from the actuator to the valve needle, shocks caused by the high impacts on the valve needle or by excessive acceleration or deceleration of the valve needle are transmitted back to the actuator and this can result in damage to the actuator. With a hydraulically actuated fuel injection valve, the actuators for the control valve are not positioned where they are subjected to potentially damaging shocks caused by movements of the valve needle. That is, if a hydraulically actuated valve slams shut, the shock from the needle impacting the seat is not transmitted to the actuator of the control valve. In addition, unlike directly actuated fuel injection valves, hydraulically actuated fuel injection valves do not have the same ability to command the valve needle to control its position and acceleration. Accordingly, the disclosed strategies for controlling the closing movement of directly actuated valves solve problems that are most relevant to valves that are directly actuated by strain-type actuators, with a solution that is believed to be unique to valves of this type. At a fundamental level, the disclosed strategy for controlling a directly actuated valve with a strain-type actuator, including the disclosed strategy for closing the valve, comprises maintaining a compressive stress on the actuator that is greater than a predetermined minimum by applying a pre-load compressive stress to the actuator and limiting at least one of: (a) acceleration and deceleration of the valve member when moving between open and closed positions; and, (b) velocity of the valve member when contacting the valve seat.

The motivating advantages for developing the disclosed method and apparatus were to reduce impact and the potential for damage and wear to the actuator and other components, while also improving valve performance by reducing the amount of fuel injected late in the power stroke. However, there are additional advantages of the disclosed method and apparatus, including reduced operational noise. For some applications, the seating noise can form a significant part of the overall operational noise, so an additional benefit of reducing impact forces upon closing the valve is reduced operational noise.

While the invention is particularly suited to the disclosed examples of directly actuated fuel injection valves and a method of operating them, as already noted, the directly actuated valve and method of closing it can be applied to other applications. Any valve that benefits from fast and precise closing for delivering a fluid in the liquid or gaseous phase can employ the disclosed invention. Accordingly, while particular elements and embodiments of the present invention have been shown and described, it will be understood, of course, that the invention is not limited thereto since modifications can be made by those skilled in the art without departing from the scope of the present disclosure, particularly in light of the foregoing teachings.

What is claimed is:

1. A method of operating a directly actuated valve that comprises a strain-type actuator operable by an actuator driver to actuate a valve member to travel between a closed position in which said valve member contacts a valve seat and an open position in which said valve member is spaced apart from said valve seat, said method comprising transmitting displacements from said strain-type actuator to said valve member, applying a pre-load compressive stress to said actuator, and limiting to less than predetermined limits at least one of: (a) acceleration and deceleration of said valve member when moving between said open positions and said closed position, and (b) velocity of said valve member immediately before contacting said valve seat, to maintain a compressive stress on said actuator that is greater than a predetermined minimum stress.

2. The method of claim 1 further comprising applying said pre-load compressive stress mechanically from a spring.

3. The method of claim 1 wherein said actuator comprises a piezoelectric element.

4. The method of claim 3 wherein said pre-load compressive stress is greater than or equal to 4 MPa.

5. The method of claim 3 wherein said predetermined minimum stress is at least 1 MPa.

6. The method of claim 1 wherein said actuator comprises a magnetostrictive element.

7. The method of claim 6 wherein said pre-load compressive stress is between 10 MPa and 14 MPa.

8. The method of claim 6 wherein said predetermined minimum stress is at least 5 MPa.

9. The method of claim 1 further comprising reducing velocity of said valve member immediately before contacting said valve seat to less than one meter per second.

10. The method of claim 1 further comprising limiting acceleration and deceleration of said valve member so that said compressive stress on said actuator is maintained above said predetermined minimum stress.

11. The method of claim 1 wherein said predetermined limits in said limiting step are predetermined as a function of said predetermined minimum stress, with a higher predetermined minimum stress allowing higher predetermined limits.

12. The method of claim 1 wherein the step of transmitting displacements from said strain-type actuator to said valve member further comprises transmitting displacements through a passive hydraulic link.

13. The method of claim 12 wherein said passive hydraulic link is filled with a hydraulic fluid that is a smart fluid that has a viscosity or flow resistance that can be controlled to be different values at different times, the method further comprising controlling the hydraulic fluid to have a higher viscosity or resistance to flow when the valve is being actuated and open and a lower viscosity or resistance to flow when the valve is closed.

14. A method of operating a directly actuated valve that comprises a strain-type actuator operable by an actuator driver to actuate a valve member to travel between a closed position in which said valve member contacts a valve seat and an open position in which said valve member is spaced apart from said valve seat, said method comprising transmitting displacements from said strain-type actuator to said valve member, applying a pre-load compressive stress to said actuator that maintains a compressive stress on said actuator that is greater than a predetermined minimum stress and actuating said valve member a closing distance from said open position to said closed position by shaping a signal from said actuator driver so that for a first part of said signal when said valve member travels a majority of said closing distance said signal changes in magnitude at a first rate averaged over time that is higher than a second rate averaged over time during a second part of said signal, which ends when contact between said valve member and said valve seat is restored.

15. The method of claim 14 wherein said signal is shaped to have at least two distinct slopes of signal magnitude plotted against time, with said first part of said signal having a steeper slope than said second part.

16. The method of claim 15 wherein said signal has a constant slope in said first part.

17. The method of claim 15 wherein said signal has a constant slope in said second part.

18. The method of claim 14 wherein said signal is shaped to have at least three distinct slopes with a first segment having the steepest slope and successive slopes being progressively shallower.

19. The method of claim 14 wherein said signal is step-shaped over time with consecutive steps in said first part having a greater change in signal magnitude from one step to the next step compared to consecutive steps in said second part.

20. The method of claim 14 wherein said signal is shaped to follow a continuous curve with a steep first part that transitions into a shallow second part.

21. The method of claim 20 wherein said signal is shaped as a function of 1/x where x is time.

22. The method of claim 14 further comprising using said directly actuated valve to regulate flow of a process fluid that is in a gaseous phase when it flows between said valve member and said valve seat.

23. The method of claim 14 further comprising using said directly actuated valve to inject a fuel into an internal combustion engine.

24. The method of claim 23 wherein said fuel is injected from said directly actuated valve into a combustion chamber of said internal combustion engine.

25. The method of claim 24 further comprising operating said engine with a compression ratio of at least 10:1.

26. The method of claim 24 further comprising operating said engine with a compression ratio of at least 14:1.

27. The method of claim 14 wherein said strain-type actuator comprises piezoelectric elements and said actuator driver controls voltage that is applied to said piezoelectric elements whereby said method comprises programming said actuator driver to change voltage magnitude.

28. The method of claim 14 wherein said strain-type actuator comprises a magnetostrictive member and said actuator driver controls electrical current that is applied to an electromagnetic coil to change the strength of a magnetic field directed through said magnetostrictive member whereby said method comprises programming said actuator driver to change electrical current magnitude.

29. The method of claim 14 wherein said pre-load compressive stress maintains a compressive stress on said actuator above a predetermined minimum stress.

30. The method of claim 29 wherein said actuator comprises piezoelectric elements.

31. The method of claim 30 wherein said pre-load is at least 4 MPa.

32. The method of claim 30 wherein said predetermined minimum stress is greater than or equal to 1 MPa.

33. The method of claim 29 wherein said actuator comprises magnetostrictive elements.

34. The method of claim 33 wherein said pre-load is between 10 MPa and 14 MPa.

35. The method of claim 33 wherein said predetermined minimum stress is greater than or equal to 5 MPa.

36. The method of claim 14 further comprising commanding a time duration for said first part that is less than 0.1 milliseconds.

37. The method of claim 14 further comprising commanding a time duration for said second part that is less than 0.9 milliseconds.

38. The method of claim 14 further comprising limiting acceleration of said valve member to less than a predetermined value during said first part of said signal.

39. The method of claim 38 wherein limits on acceleration are determined as a function of said predetermined minimum stress.

40. The method of claim 14 further comprising limiting deceleration of said valve member to less than a predetermined value when transitioning from said first part of said signal to said second part of said signal.

41. The method of claim 40 wherein limits on deceleration are determined as a function of said predetermined minimum stress.

42. The method of claim 14 further comprising limiting absolute velocity of said valve member to less than a predetermined velocity.

43. The method of claim 42 wherein limits on absolute velocity are determined as a function of said predetermined minimum stress.

44. The method of claim 14 wherein immediately before said valve member closes against said valve seat, said valve member is moving with a velocity that is less than or equal to 1.0 m/s.

45. The method of claim 14 further comprising limiting fluid mass flow rate flowing through said directly actuated valve during said second part to less than 20% of a designed maximum fluid mass flow rate through said directly actuated valve.

\* \* \* \* \*